(12) United States Patent
Franaszek et al.

(10) Patent No.: US 6,665,787 B2
(45) Date of Patent: Dec. 16, 2003

(54) VERY HIGH SPEED PAGE OPERATIONS IN INDIRECT ACCESSED MEMORY SYSTEMS

(75) Inventors: Peter A. Franaszek, Mt. Kisco, NY (US); Charles O. Schulz, Ridgefield, CT (US); T. Basil Smith, III, Wilton, CT (US); Robert B. Tremaine, Stormville, NY (US); Michael Wazlowski, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 09/795,414

(22) Filed: Feb. 28, 2001

(65) Prior Publication Data

US 2001/0042185 A1 Nov. 15, 2001

Related U.S. Application Data

(63) Continuation-in-part of application No. 09/627,516, filed on Jul. 28, 2000, now Pat. No. 6,401,181.
(60) Provisional application No. 60/185,736, filed on Feb. 29, 2000.

(51) Int. Cl.[7] .............................................. G06F 12/08
(52) U.S. Cl. ....................................................... 711/206
(58) Field of Search ................................. 711/206, 165, 711/207, 208, 203

(56) References Cited

U.S. PATENT DOCUMENTS

| 5,628,023 A | * | 5/1997 | Bryant et al. | 711/207 |
| 5,761,536 A | | 6/1998 | Franaszek | 395/888 |
| 5,784,699 A | * | 7/1998 | McMahon et al. | 711/171 |
| 5,812,816 A | * | 9/1998 | Parady | 711/165 |
| 5,864,859 A | | 1/1999 | Franaszek | 707/101 |

* cited by examiner

Primary Examiner—Donald Sparks
Assistant Examiner—Kathy Takeguchi
(74) Attorney, Agent, or Firm—Scully, Scott, Murphy & Presser; Derek S. Jennings

(57) ABSTRACT

A computing system and method employing a processor device for generating real addresses associated with memory locations of a real memory system for reading and writing of data thereto, the system comprising: a plurality of memory blocks in the real memory system for storing data, a physical memory storage for storing the pages of data comprising one or more real memory blocks, each real memory block partitioned into one or more sectors, each comprising contiguous bytes of physical memory; a translation table structure in the physical memory storage having entries for associating a real address with sectors of the physical memory, each translation table entry including one or more pointers for pointing to a corresponding sector in its associated real memory block, the table accessed for storing data in one or more allocated sectors for memory read and write operations initiated by the processor; and, a control device for directly manipulating entries in the translation table structure for performing page operations without actually accessing physical memory data contents. In this system, the actual data of the pages involved in the operation are never accessed by the processor and therefore is never required in the memory cache hierarchy, thus eliminating the cache damage normally associated with these block operations. Further the manipulation of the translation table will involve reading and writing a few bytes to perform the operation as opposed to reading and writing the hundreds or thousands of bytes in the pages being manipulated.

35 Claims, 16 Drawing Sheets

VERY HIGH SPEED PAGE OPERATIONS IN INDIRECT ACCESSED MEMORY SYSTEMS

CROSS REFERENCE TO RELATED APPLICATION

This application is a continuation-in-part of U.S. patent application Ser. No. 09/627,516 filed Jul. 28, 2000 is now U.S. Pat. No. 6,401,181 which claims the benefit of U.S. Provisional Patent Application Ser. No. 60/185,736 filed Feb. 29, 2000.

BACKGROUND OF THE INVENTION

1. Field of the Invention

The present invention relates in general to data processing systems and in particular to data processing systems which dynamically allocate main memory for use by the operating system software and application software. Still more particularly, the present invention relates to systems which can directly manipulate pages of memory by modifying the translation table associated with the dynamically allocated main memory.

2. Discussion of the Prior Art

In computer systems it is customary that there be one-to-one correspondence between the memory address produced by the processor and a specific area in the physical memory of the system. It is an error for the processor to request access to an address which does not have an associated physical memory area. This limits the operating system and applications to an address space determined by the actual physical memory installed in the system. Modem computer systems have overcome this limitation through the use of virtual memory which implements a translation table (TT) to map program addresses to real memory addresses.

With virtual memory the program works in an address space limited only by the processor architecture. It is a function of the operating system to ensure that the data and code a program is currently using is in main memory and that the translation table can map the virtual address to the real address correctly. In a virtual memory system the allocation of memory is most commonly performed by the operating system software. This requires an interrupt of the instruction sequence so that the privileged kernel code can allocate physical memory to the area being accessed so that normal program flow can continue without error. This interrupt and the kernel processing to allocate physical memory requires a significant amount of processing time and upsets the normal pipelining of instructions through the CPU.

There currently exist schemes for reducing operating system process interruptions. For instance, the reference entitled "Design and Analysis of Internal Organizations for Compressed Random Access Memories" by Peter A. Franaszek and John T. Robinson, IBM Research Report RC21146(94535), dated Oct. 28, 1998, describes a low level main memory design for storing compressed data that includes a directory portion and a collection of fixed size blocks which are used to store lines in compressed format. In the memory storage scheme described herein, highly compressible lines may be stored entirely within a directory entry; otherwise, the directory entry points to one or more of the fixed size blocks which are used to store the line in compressed format. The system further makes use of page tables which translate virtual addresses to real addresses which correspond to the location in the directory of the directory entry for the line and which includes information pertaining to blocks holding a compressed line. Specifically, the information in a directory entry includes flags, fragment combining information, and, assuming fixed size entry structure pointers to one or more fixed size blocks. On a cache miss, the memory controller and decompression hardware finds the blocks allocated to store the compressed line and dynamically decompresses the line to handle the miss. Similarly, when a new or modified line is stored, the blocks currently allocated to the line are made free (if the line currently resides in the RAM), the line is compressed, and then stored in the RAM by allocating the required number of blocks.

Furthermore, U.S. Pat. No. 5,761,536 is directed to a memory organization technique utilizing a compression control device for storing variable length objects (compressed memory) in fixed-size storage blocks by enabling fixed size storage blocks to receive remaining portions (leftover compressed memory pieces or fragments) of variable length objects that take up less than a full fixed-size storage block. The system thus reduces memory fragmentation.

U.S. Pat. No. 5,864,859 is directed to a compression store addressing technique for storing variable length objects (compressed lines, each representing, e.g., ¼ of a page) in fixed size blocks so that accessing an individual line may be accomplished quickly and with little change to existing software. In particular, the beginning of any line within a page may be accessed with a single pointer plus an offset. Associated with the compression store is a list of free or available blocks (free list) which is accessed for enabling variable length object storage.

Aforementioned commonly-owned, co-pending U.S. patent application Ser. No. 09/627,516 addresses the desirability to provide a mechanism that enables the physical memory to be dynamically allocated in a manner such that the interruption in program flow is eliminated, and, furthermore, provides a mechanism for facilitating the management of memory pools so that the various processes and users may share the system resources fairly.

It is the case that certain simple operations in computer systems such as clear block and move block are commonly performed on large blocks a contiguous memory bytes called pages. These operations often require that the processor access each individual byte in the page or pages. This makes the operations take an appreciable amount of time and cause the total contents of the page or pages to be loaded into each level of the memory cache hierarchy. This cache damage causes further performance impacts since it evicts other data and programs which are being used by the processor. Subsequent accesses of this purged data will take additional time to reload the appropriate data into the caches It would thus be highly desirable to provide in a computer system using dynamically allocated physical memory and a translation table for managing this memory, a mechanism for performing these page operations without requiring the use of the processor.

SUMMARY OF THE INVENTION

It is an object of the invention to provide, in a computer system using dynamically allocated physical memory and a translation table for managing this memory, a mechanism for performing the page operations without requiring intervention of the processor.

It is another object of the invention to provide, in a computer system using dynamically allocated physical memory and a translation table for managing this memory, a mechanism under the control of hardware for performing the page operations by manipulating only the translation table.

According to the principles of the invention, there is provided a computing system and method employing a processor device for generating real addresses associated with memory locations of a real memory system for reading and writing of data thereto, the system comprising: a plurality of memory blocks in the real memory system for storing data, a physical memory storage for storing the pages of data comprising one or more real memory blocks, each real memory block partitioned into one or more sectors, each comprising contiguous bytes of physical memory; a translation table structure in the physical memory storage having entries for associating a real address with sectors of the physical memory, each translation table entry including one or more pointers for pointing to a corresponding sector in its associated real memory block, the table accessed for storing data in one or more allocated sectors for memory read and write operations initiated by the processor; and, a control device for directly manipulating entries in the translation table structure for performing page operations without actually accessing physical memory data contents.

Thus, according to the present invention, the actual data of the pages involved in the operation are never accessed by the processor and therefore is never required in the memory cache hierarchy, thus eliminating the cache damage normally associated with these block operations. Further the manipulation of the translation table will involve reading and writing a few bytes to perform the operation as opposed to reading and writing the hundreds or thousands of bytes in the pages being manipulated.

Such a method and apparatus of the invention results in a significant savings in time to perform the actual operation and further represents a smaller performance impact on other activities of the processor. Preferably, the method and apparatus of the invention may be implemented in the design of the compressed memory management systems for server devices, PCs and the like, implementing compression/decompression algorithms.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

Figure 1:
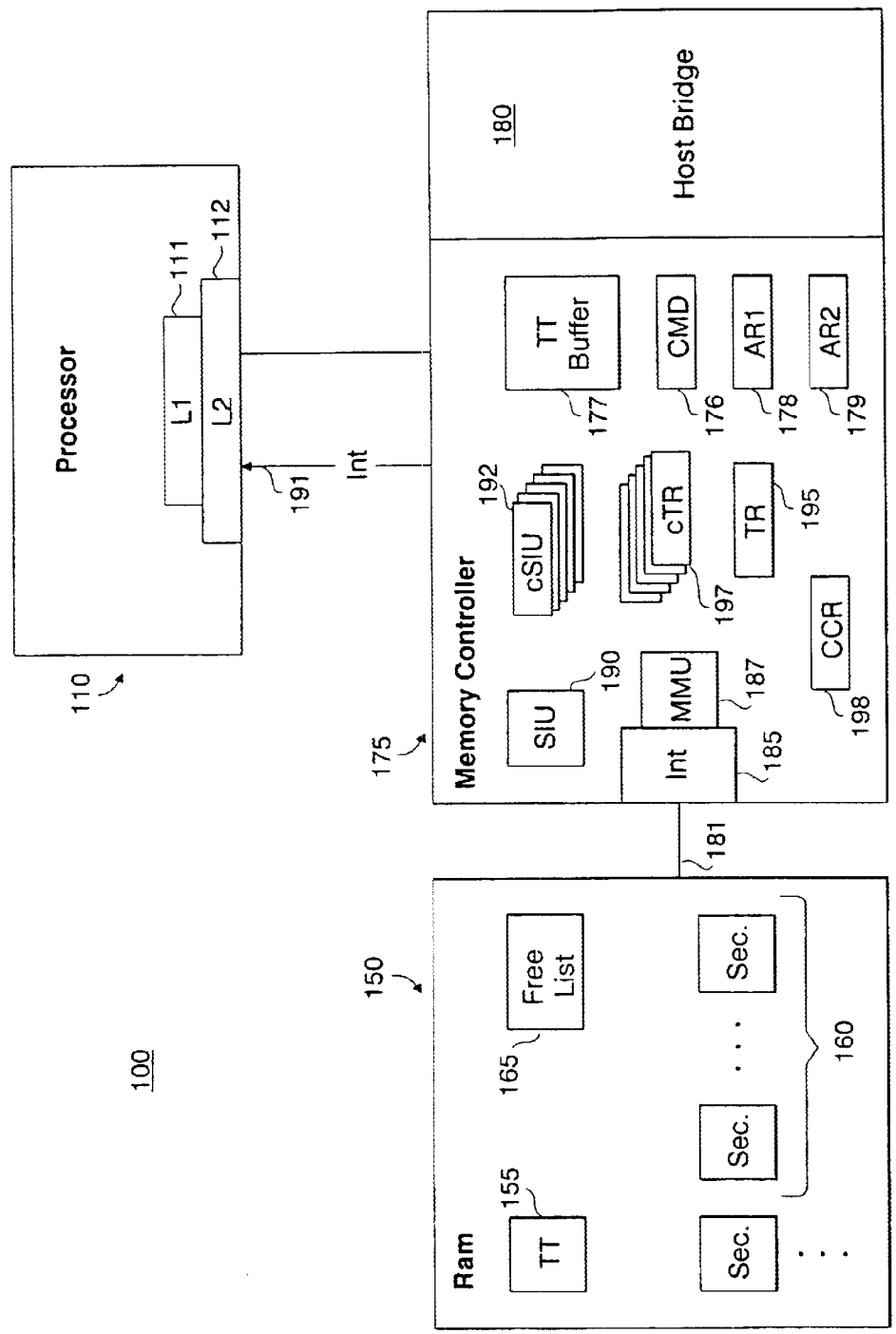
FIG. 1 depicts generally the data processing system 100 with facilities for dynamic management of physical memory and high speed page operations according to the invention.

FIG. 1 depicts generally a data processing system 100 with facilities for dynamic management of physical memory. Specifically, in the system of FIG. 1, there is provided at least one central processing unit (CPU) 110 which reads and stores data to real address locations in a real memory system 150 and includes L1 and L2 level caches 111, 112 for example. Additionally, interfaced between the CPU and the real memory system is a memory controller device 175 and host bridge 180 operating in conjunction to present real memory images to the CPU, and managing the allocation and manipulation of the physical memory.

According to the invention, the physical memory 150 includes Random Access Memory (RAM/DRAM) which includes various data structures for managing dynamically allocated physical memory and the data which the CPU reads and writes. These data structures in the RAM include: 1) a mapping table 155 such as a Translation Table (TT) which includes entries comprising pointers to a plurality of sectors 160 where the data is stored in the RAM (i.e., provides a mapping from a CPU generated real memory address to the physical address where the associated data is stored); and, 2) a Free List structure 165 which comprises a list of all of the available, unused, sectors in the physical memory. The plurality of fixed blocks of physical memory (hereinafter "sectors") comprise all of the physical memory, except the areas required for the TT 155 and the Free List 165.

The RAM 150 is managed by the Memory Controller 175 to carry out the read and store requests from the CPU and any I/O operations via the Host Bridge 180. The Memory Controller 175 includes an interface 185 to the RAM which provides the addressing and controlling signals 181 to the DRAM memory. The interface 185 operates in conjunction with a Memory Management Unit (MMU) 187 that accepts read and store requests from the CPU 110 and the Host Bridge 180 with associated read addresses. The MMU comprises registers and associated logic 190 for maintaining a count of the number of sectors in DRAM which have been assigned to real addresses (i.e., sectors in use or "SIU"). The MMU additionally includes one or more threshold registers (TR) 195 and comparison logic for continuously comparing the count maintained in the SIU with the TR. When the count maintained by the SIU becomes greater than one or more of the TR(s), an interrupt signal 191 is presented to the CPU 110. Preferably, both the TR(s) and the SIU may be read by the CPU software, however, only the TR(s) may be written by the CPU.

A common task of memory managers such as those found in modern operating systems is to control pools of memory so that the various processes and users share the system resources fairly. To facilitate the management of these memory pools, real memory pages may be grouped into classes and the physical memory usage of each of these classes monitored and managed by the dynamic memory system. To facilitate this classing, each page is provided with a tag which associates it with one of the classes. A typical system may have sixteen (16) classes. For each class, a "Class Sectors In Use" (cSIU) register 192 is provided which always maintains the current count of the sectors that are allocated to pages in that class. In addition to the cSIU registers, there is associated with each cSIU one or more "Class Threshold Registers" (cTR) 197 which may be read and written by the CPU. These cTR's are continuously compared with its associated cSIU 192. If the cSIU is found to have a count larger than the cTR value, the memory controller 175 will alert the management software by interrupting the processor.

Figure 2:
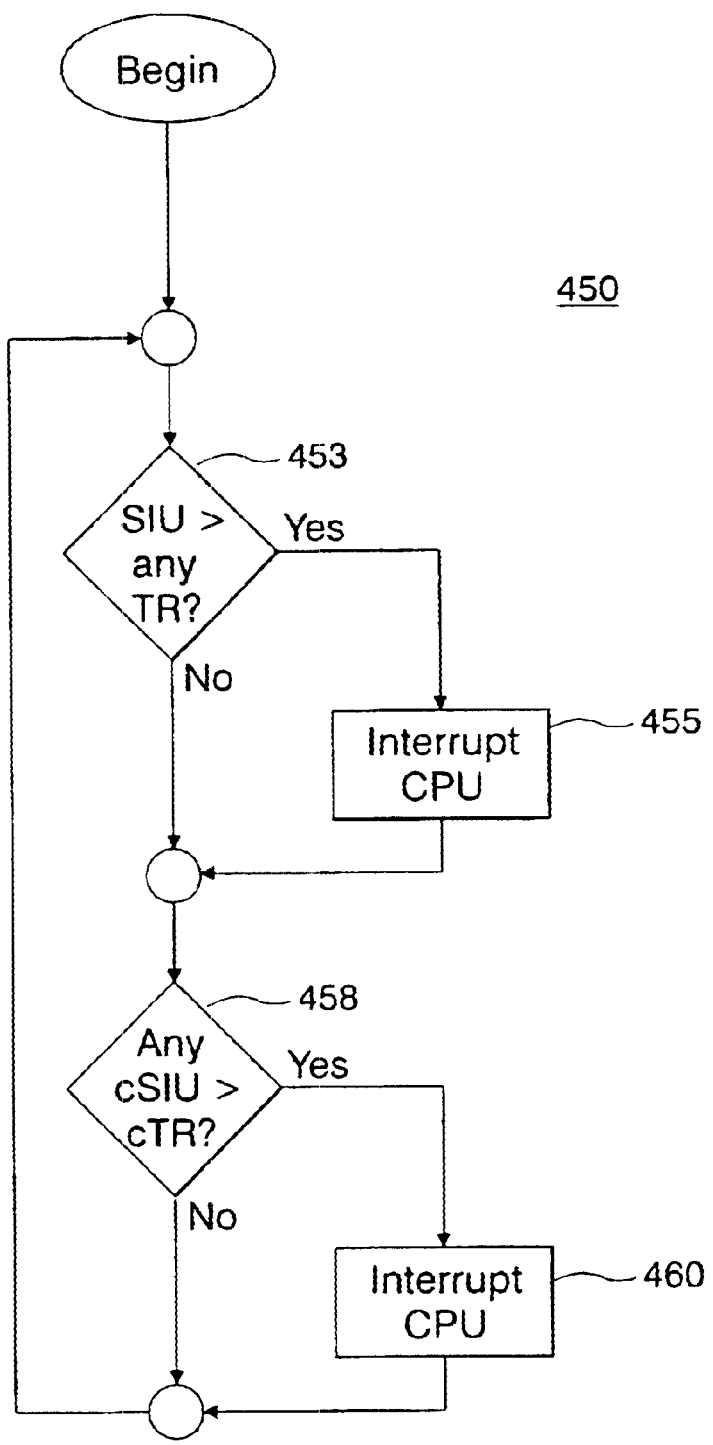
FIG. 2 illustrates the continuous running SIU and cSIU monitoring process 450.
Figure 9:
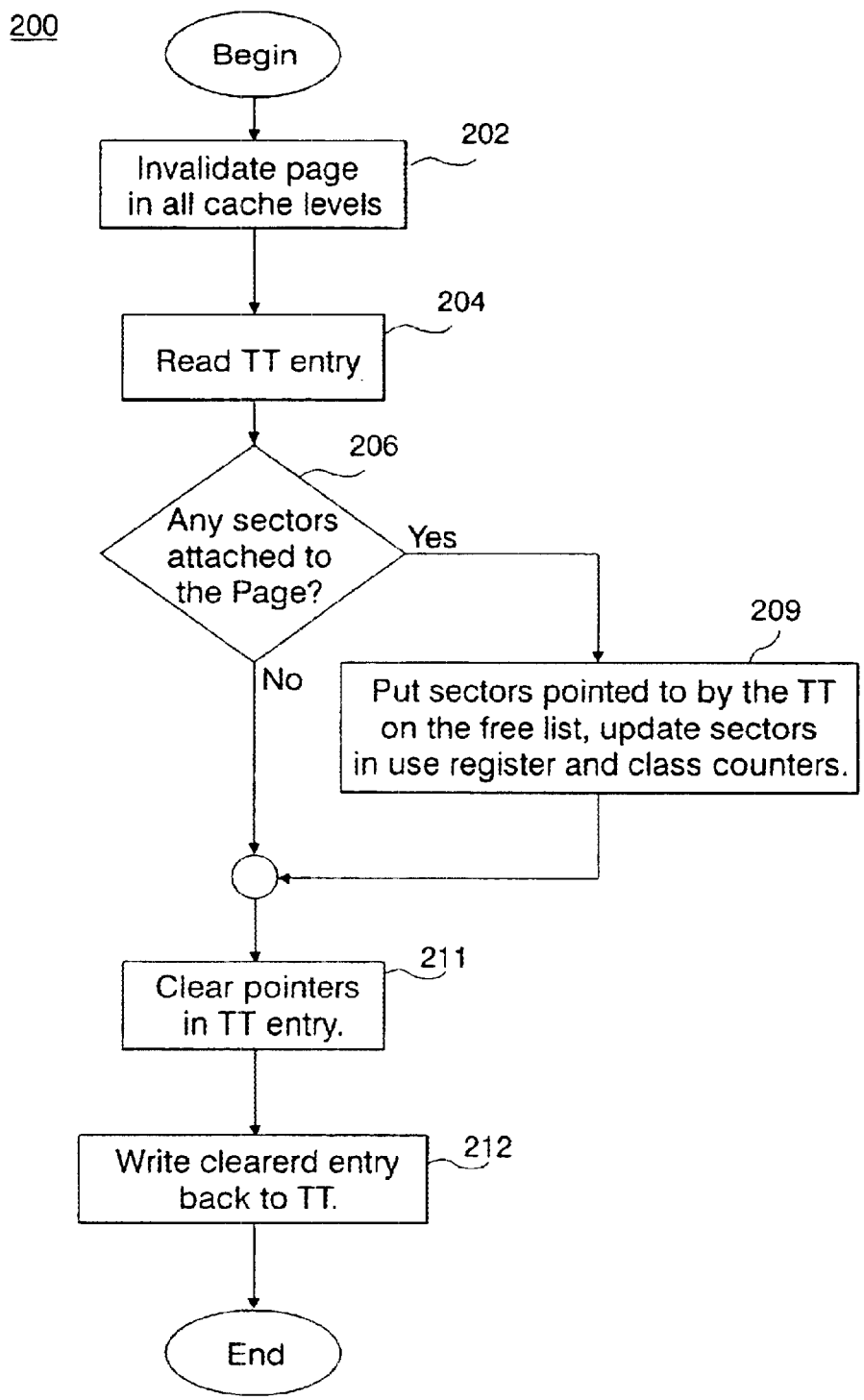
FIG. 9 is a flow diagram for the Empty Page operation 200 in the indirect accessed memory system.

FIG. 2 is a flow chart depicting the continuous running SIU and cSIU monitoring process 450. As illustrated in FIG. 9, the continuous running process implements a step 453 wherein the current count maintained by the SIU is compared to the TR(s). If the current count maintained by the SIU is larger than the count maintained in the TR, then the CPU is interrupted at step 455. Likewise, at step 458 the current count maintained by each of the cSIU's are compared to their associated cTR(s). If any of these comparisons indicate a cSIU count greater than the associated cTR, then the CPU will be interrupted at step 460.

Figure 3:
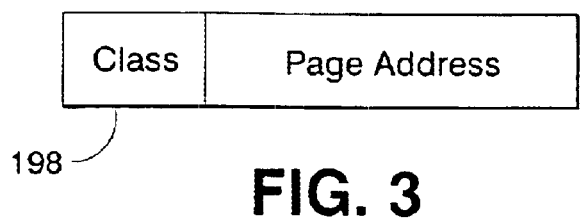
FIG. 3 depicts the format for the Class Control Register (CCR) which may be written with a page address and the class which is to be assigned to the page.
Figure 4:
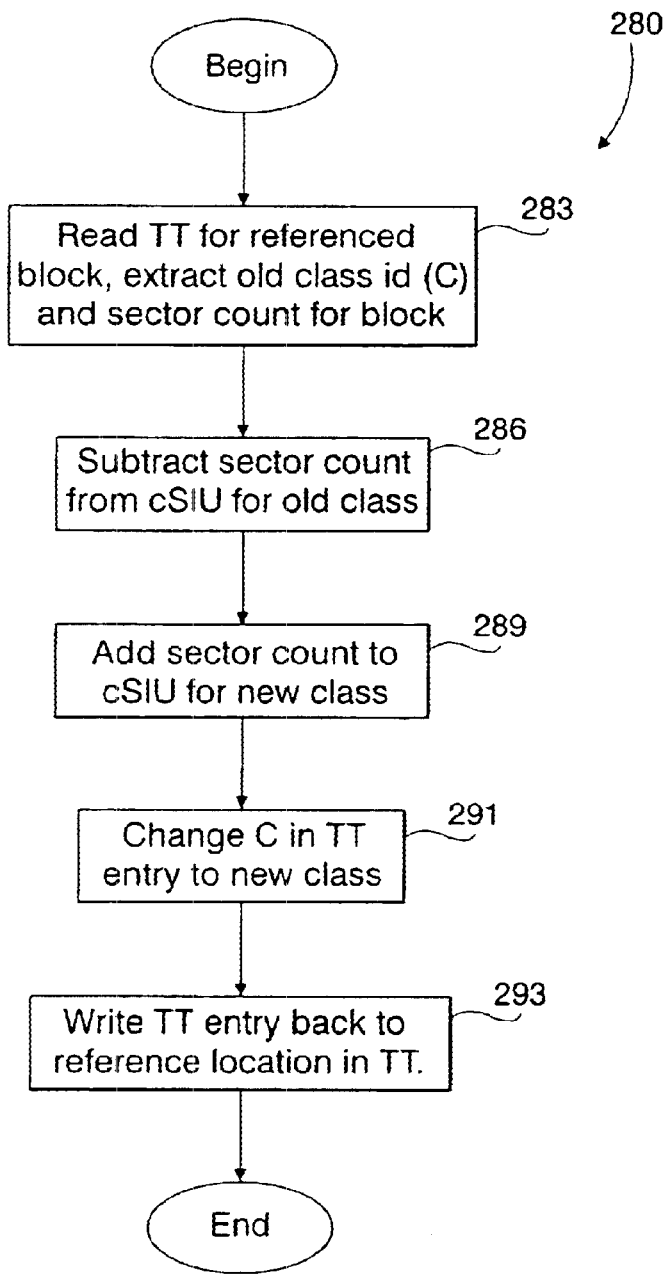
FIG. 4 illustrates the process 280 for updating the TT and cSIU's when the CCR is written.

Associated with the memory classes there is a mechanism which allows software to control which real memory pages are associated with a given memory class. For example, in the memory controller, a "Class Control Register" (CCR) 198 is provided which may be written with page address and the class that is to be assigned to the page in the manner as depicted in FIG. 3. When a page reference and a class are written to the CCR the 'C' field of the TT entries for that page are updated to the new value and the 'cSIU' registers of the old and new classes are update to reflect the change FIG. 4 is a flow diagram depicting the mechanism 280 for updating the TT entries 156 and SIUs when the CCR 198 is written with page and associated class information. As shown in FIG. 4, at step 283, there is performed a first step of reading the translation table entry 156 for the referenced block, and, extracting the old class id ("C") and the sector count for the block. Then, as indicated at step 286, there is performed the step of subtracting the sector count from the associated cSIU register 192 (FIG. 1) for that old class C. Then, at step 289, the sector count is updated (added) to the cSIU for the new class written into the register. The corresponding entry 156 in the TT 155 is additionally updated with the new class designation at step 291, and the TT entry 156 is written back to the reference location in the TT 155 at step 293.

According to the invention, the real memory visible to the CPU and the I/O comprises a set of equal sized blocks of addressable words. For convenience, the size of these blocks is chosen to be an integral power of two (2) of the minimum addressable unit in the memory (byte). For the preferred embodiment, the block size is chosen to be 1024 bytes, with each real address comprising a memory of exactly one of these real memory blocks. The TT has exactly one entry for each block of real memory and is organized in a regular fashion such that a simple hash of the read address will index in the TT to the associated entry. Such a simple hash may comprise the use of higher order bits as the index. Referring back to FIG. 1, an area of the physical memory 150 is set aside for the TT 155, the size of which is dependent on the size of the real memory presented to the CPU. In the preferred embodiment, each TT entry is 16 bytes and is associated with a 1024 byte block of real memory. Thus, in this case, the TT would be equal to $16/1024 = 1/64$ the size of the real memory presented to the CPU 110.

With more particularity, the Free List structure 165 of FIG. 1 comprises a list of pointers to all of the physical memory sectors which are not currently assigned to a real memory block, i.e., an unused physical memory referred to as "free space." That is the free list structure 165 comprises a stack of pointers which point to corresponding sectors in the free space and which stack expands and shrinks during system operation as sectors are assigned to blocks or recovered from blocks. That is, the stack grows deeper as sectors are added to the free space and shallower as free sectors are allocated to real memory blocks. In the preferred embodiment the free list comprises a linked list of free sectors including a "Top Of List" (TOL) pointer that points to the top most entry on the free list. This is the first entry used when fulfilling an assignment of sectors to a real memory block. These sectors are themselves members of the free list so that when they have been emptied of pointers they can also be used by real memory blocks. When a new sector is required for holding pointers to free sectors it is simply allocated from the free list and linked into the chain.

It is the case that a large portion of physical memory is simply a memory array divided up into sectors which can be used to store the data associated with a real memory block. In the preferred embodiment the sector size is chosen as 256 bytes. Thus four sectors are required to store all the data associated with a real memory block. In a compressed memory system (such as described in commonly-owned U.S. Pat. No. 5,812,817) the compressed representation of a block is of variable length depending on the compressibility of the data. In such a system the physical memory allocated to a real address block need only be sufficient to store the compressed data.

Figure 5:
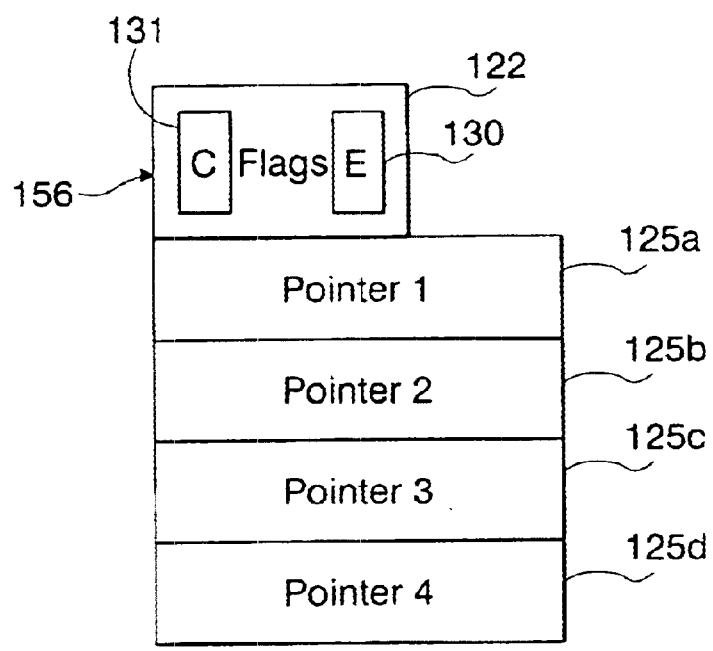
FIG. 5 is a schematic representation of a TT entry 156 in the TT table included in the physical memory.

As mentioned with respect to FIG. 1, a large portion of physical memory is simply a memory array divided up into sectors which can be used to store the data associated with a real memory block. In the preferred embodiment the sector size is chosen as 256 bytes. Thus, for example, four sectors are required to store all the data associated with a real memory block (1024 bytes). In a compressed memory system (such as described in commonly-owned U.S. Pat. No. 5,812,817) the compressed representation of a block is of variable length depending on the compressibility of the data. In such a system the physical memory allocated to a real address block need only be sufficient to store the compressed data. As mentioned, fields in the TT entry for a real address indicate the location and size of the physical memory which is assigned to store the data of the real memory block. Preferably, each TT entry is associated with a 1024 byte real memory block and will hold pointers for up to four sectors assigned to the real memory block. FIG. 5 is a schematic representation of a TT entry 156. As shown in FIG. 5, each TT entry 156 comprises a set of flag bits 122, and four (4) spaces 125a, . . . , 125d for storing respective sector pointers. One of the flag bits, bit E 130, designates that the associated real memory block is empty and that there are no sectors assigned to that block, i.e., the pointers fields 125a, ..., 125d are empty. Another field comprising one or more bits C 131 designates the class id that the real memory block is associated with. It should be understood that, as part of an initialization routine, a mechanism is provided such that there is no physical memory block associated with the index, i.e., E field, and, further that the C bit field 131 is initialized to a default value. As mentioned with respect to FIG. 4, when a page reference and a class are written to the CCR 198, the "C" field of the TT entries for that page are updated to the new value and the "cSIU" registers of the old and new classes are updated to reflect the change.

According to the invention, three operations are defined for dynamically allocating physical memory: 1) write data to a real address; 2) read data from a real address; and, 3) empty real block referenced by a real address.

Figure 6A:
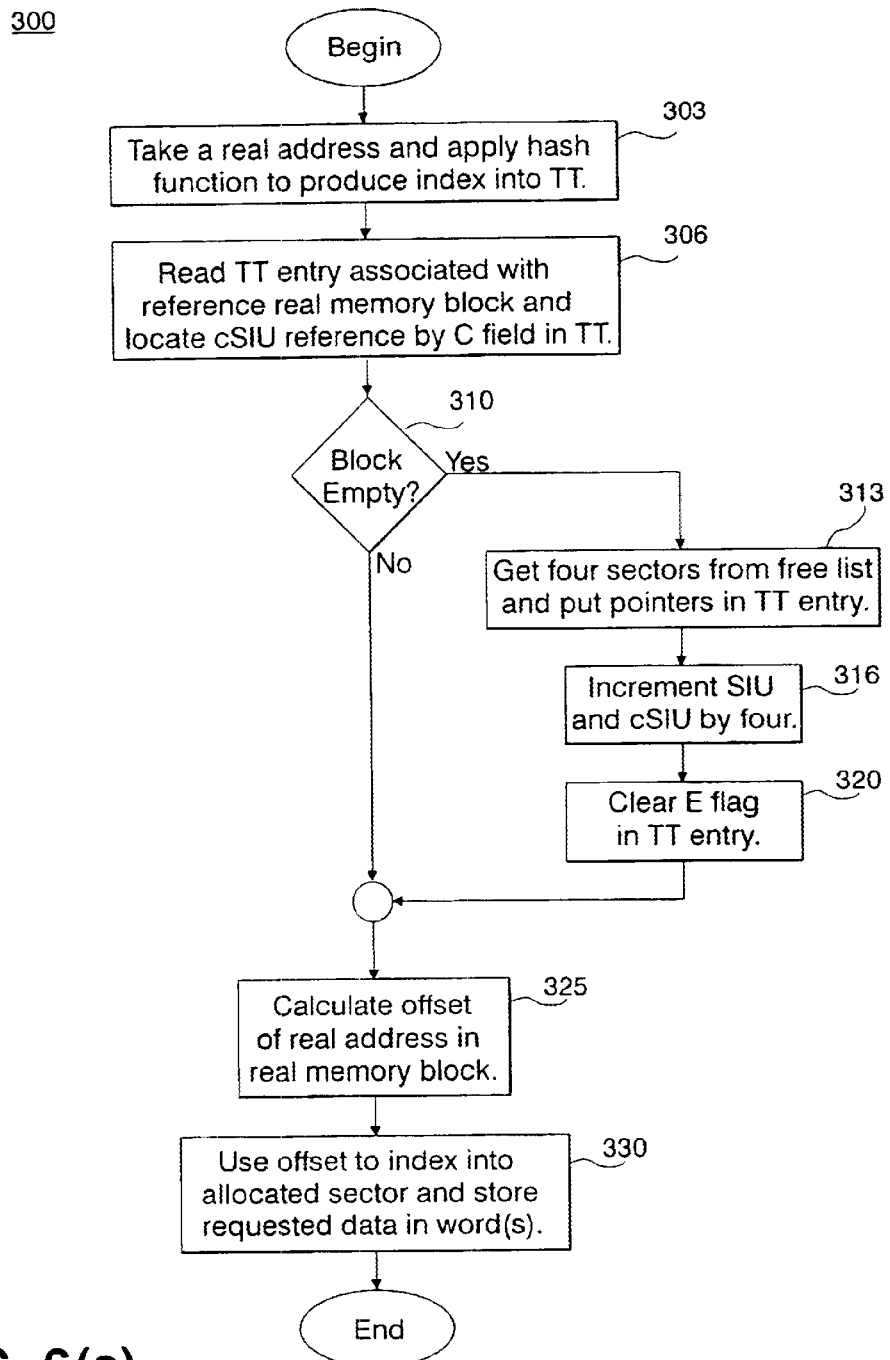
FIG. 6(a) illustrates the process for writing data into a real address in the indirect accessed memory system.

The process 300 for writing data into a real address is described in accordance with FIG. 6(a). As shown in FIG. 6(a), the process includes a first step 303 of applying a hash function to a CPU generated real address for determining an index into the TT table 155. Then, at step 306, the TT entry associated with the referenced real memory block is read. Furthermore, at step 306, the associated cSIU register is located as referenced by the C flag in the TT entry. At step 310, a determination is made as to whether the block is empty, i.e., whether the E bit flag 130 indicating no physical memory allocated to the real memory block. If the block is empty, then at step 313, four sectors are obtained from the free list 165 and corresponding pointers are placed in the respective store fields 125a, ..., 125d of the TT entry. The SIU register 190 and cSIU register 197 in the memory controller are then each incremented by four (4) at step 316 and the E bit flag 130 is cleared in the TT entry at step 320. After step 320, or if, at step 310, it is determined that the block is not empty, the process continues to step 325 where an offset of the real address in the real memory block is calculated. Then, at step 330, the calculated offset is used to index into allocated sector and the requested data is stored in word(s). Thus, from the write data process depicted in FIG. 6(a), it is understood that if the block is marked as empty, i.e., there is no physical memory allocated to the block, sectors are assigned to the block before the write is performed. Otherwise, the write is performed to the appropriate word(s) in one of the sectors assigned to the block.

Figure 6B:
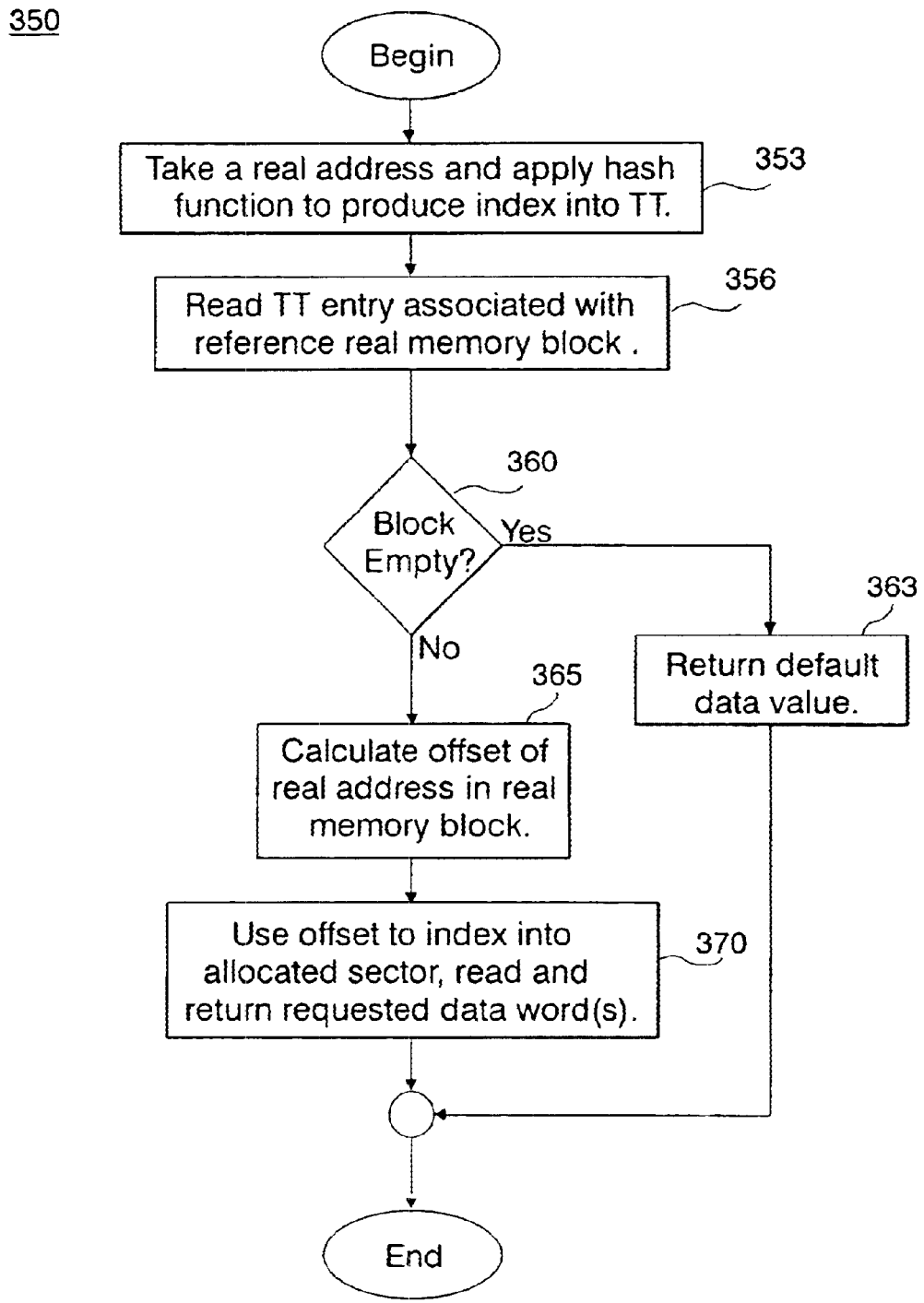
FIG. 6(b) illustrates the process for reading data from a real address in the indirect accessed memory system.

The process for reading data from a real address is described in accordance with FIG. 6(b). As shown in FIG. 6(b), the process 350 for reading data from a real address includes a first step 353 of applying a hash function to a CPU generated real address for determining an index into the TT table 155. Then, at step 356, the TT entry associated with the referenced real memory block is read. At step 360, a determination is made as to whether the block is empty, i.e., whether the E bit flag 130 indicating no physical memory allocated to the real memory block. If the block is empty, then at step 363, a default data value is returned and the process terminates. If, at step 360, it is determined that the block is not empty, then the process continues to step 365 where an offset of the real address in the real memory block is calculated. Then, at step 370, the calculated offset is used as an index into allocated sector and the requested data word(s) is read and returned. Thus, from the read data process depicted in FIG. 6(b), it is understood that the data is retrieved from the appropriate place in one of the sectors assigned to the block unless the block is empty. If the block is empty a default value is returned for the read. Note that a read of an empty block could optionally signal a memory access fault to the CPU.

Figure 6C:
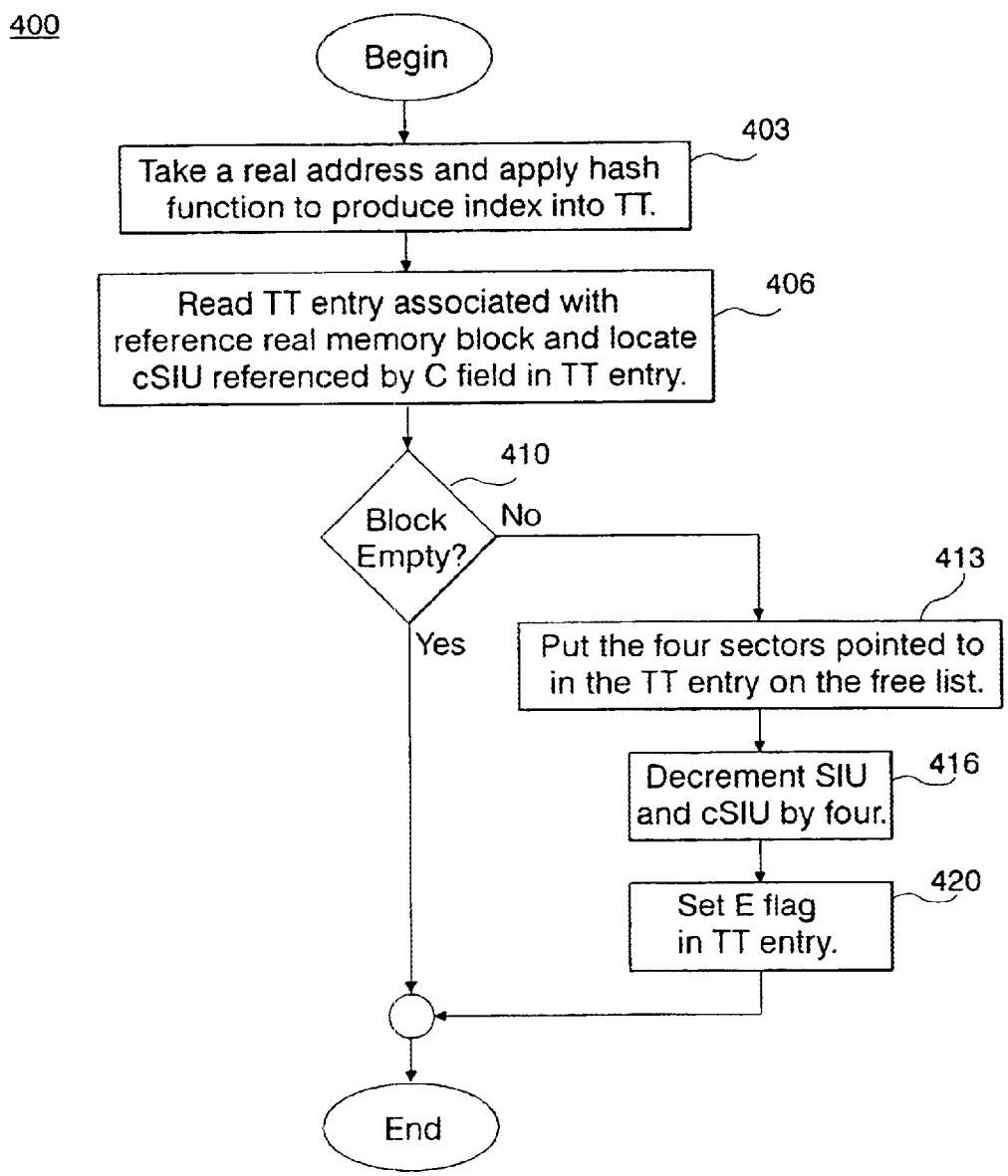
FIG. 6(c) illustrates the process for deallocating the physical memory sectors in the indirect accessed memory system.

When a real memory block is no longer needed, the operating system may deallocate the physical memory sectors associated with that real memory block by issuance of an "empty real block" command from the processor. The process for deallocating the physical memory sectors that are no longer needed is described in accordance with FIG. 6(c). As shown in FIG. 6(c), the process 400 for deallocating the physical memory sectors includes a first step 403 of applying a hash function to a CPU generated real address for determining an index into the TT table 155. Then, at step 406, the TT entry associated with the referenced real memory block is read. Furthermore, at step 406, the associated cSIU register is located as referenced by the C flag in the TT entry. At step 410, a determination is made as to whether the block is empty indicating no physical memory allocated to the real memory block. If the block is empty, then the process terminates. Otherwise, if it is determined that the block is not empty, then at step 413, the four sectors pointed to by the corresponding TT entry are added to the free list 165. The SIU register 190 and the cSIU register 197 in the memory controller are then each decremented by four (4) at step 416 and the E bit flag 130 is set in the TT entry at step 420. After step 420, the process terminates. Thus, the deallocating physical memory sectors process depicted in FIG. 6(c) enables conservation of physical memory by returning the physical memory sectors to the free list for reuse with other real memory blocks.

Page Operations

In an indirectly addressed memory system as described above, certain common operations may be performed by directly manipulating the entries in the translation table (TT), without actually accessing the data bytes. Block moves and swaps, and clear block are examples of the type of operations which can be performed using this method. The data can be moved by moving only the sector pointers from the TT entry of the source block to the TT entry of the destination block. Additional block operations such the "empty real block" command described above can be implemented using this mechanism. Block control flags may also be manipulated with page operations.

These types of operations are commonly performed on pages of memory. A page is the unit of allocation used by the virtual memory manager in the operating system to assign real memory resources to processes in the system. Virtual memory pages are usually a fixed size of a few thousand bytes, 4096 bytes is the most often used page size. The block size for dynamic memory allocation is most likely somewhat smaller, e.g., 1024 bytes in an example embodiment. Thus, a page consists of a few blocks, four in the example embodiment described herein. A page operation will therefore be effected on all of the blocks making up a page as a single operation.

Figure 7:
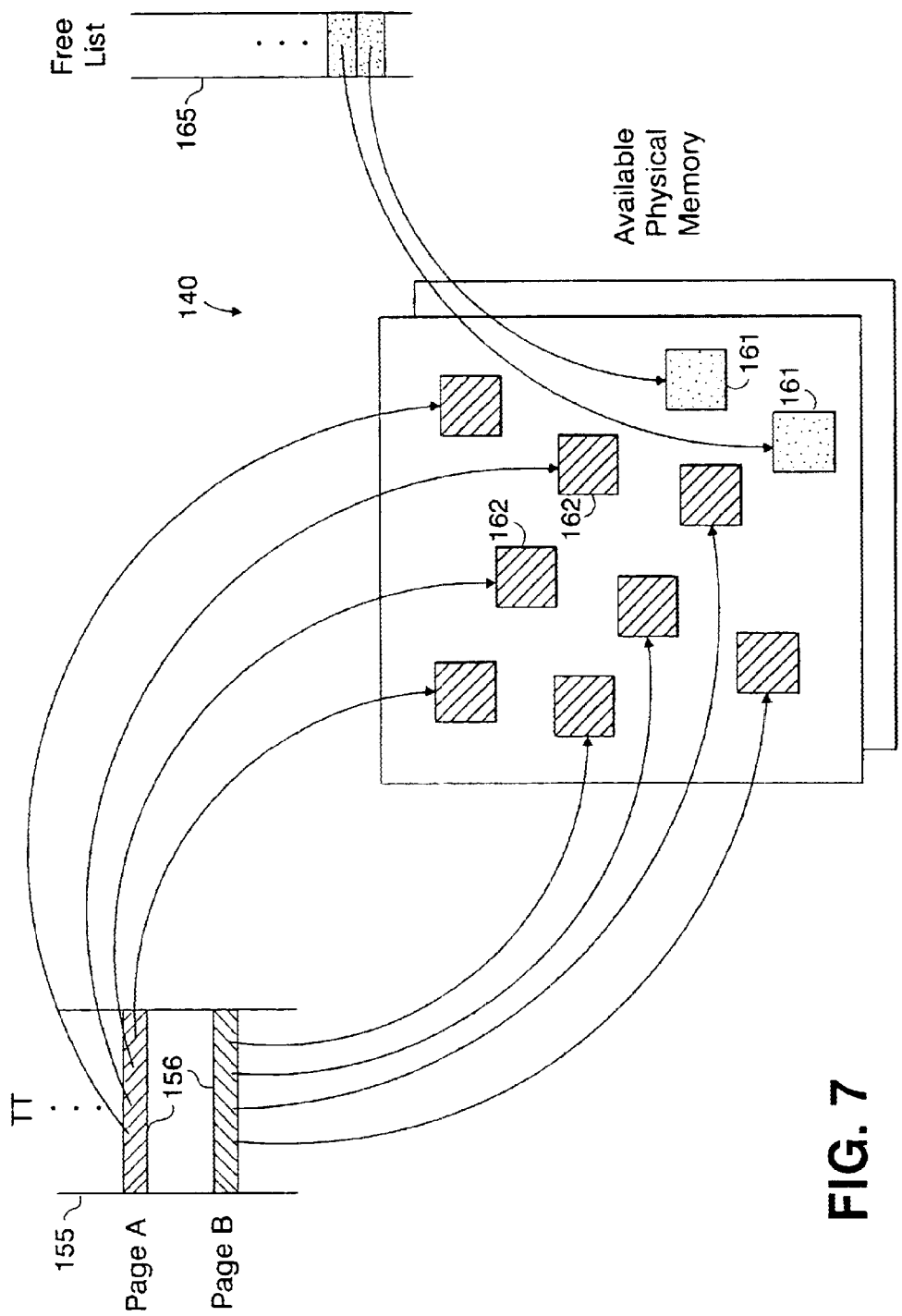
FIG. 7 depicts an example memory state 140 in the indirect accessed memory system prior to a page operation.
Figure 8:
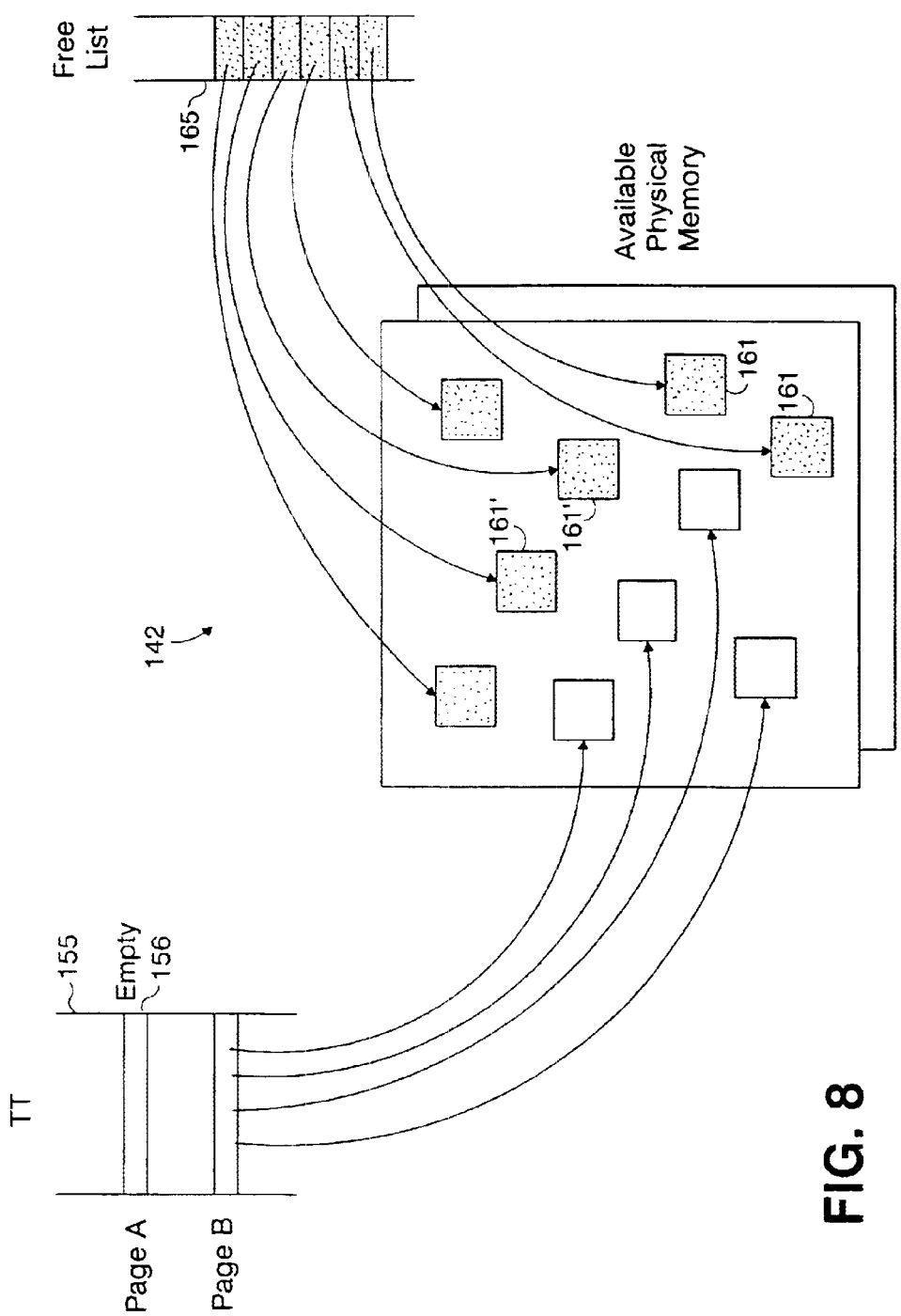
FIG. 8 illustrates the memory state 142 after the completion of the Empty page operation.

FIG. 7 depicts an example memory state 140 in the indirect accessed memory system and will be used as the starting point for several examples of page operations. Specifically, as shown in FIG. 7, there are two allocated memory pages "A" and "B" shown in the TT table 155. As depicted, each of the TT table entries 156 for pages A and B comprise pointers that point to sectors 162 in the available physical memory of the system. The free list 165 additionally includes entries including pointers to free sectors 161 in the memory. An example first page operation is an "Empty Page" operation performed on Page A whereby the page operation will cause the release of sectors 162 in physical memory associated with that page and return them to the Free List 165. FIG. 8 illustrates the memory state 142 after the completion of the Empty page operation. As shown in FIG. 8, Page A no longer has any sectors associated with it and the sectors which were associated with it prior to the Empty Page operation are now sectors 161' which are pointed to by the Free List 165.

FIG. 9 is a flow diagram for the Empty Page operation 200. As shown in FIG. 9, at a first step 202, the page to be emptied is first invalidated in all cache levels. Then, at step 204, the corresponding TT entry for a block comprising the page is read and, at step 206 a determination is made as to whether any sectors are attached to the page. If there are sectors attached to the page, then at step 209, these sectors pointed to by the TT are placed on the free list, and the corresponding SIU register and class counters are decremented. Once it is determined that no remaining sectors are attached to the page, then the corresponding TT entry is cleared of pointers at step 211 and the cleared entry is written back to the TT at step 212. As a page may comprise several blocks it should be understood that process steps 204–212 would repeat for each block in the page. It should be understood that for all of the page operations described herein, processes performed upon sectors associated with blocks will be repeated for each block of the page.

Figure 10:
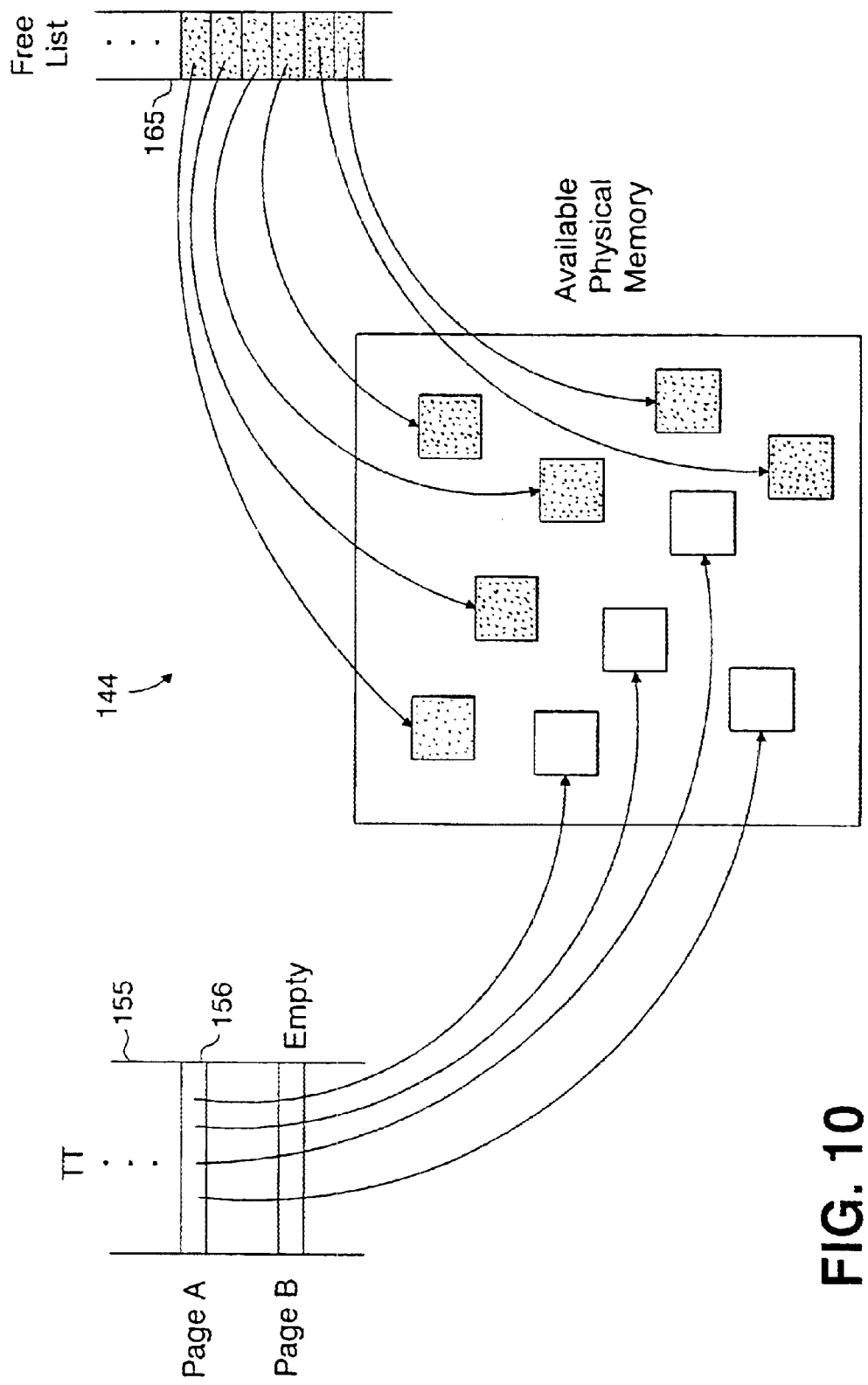
FIG. 10 illustrates the memory state 144 after the completion of the move page operation.

An example second page operation is a "Move Page" operation which is performed to move the contents of Page B to Page A. FIG. 10 illustrates the memory state 144 after the Move page operation is completed. As shown in FIG. 10, the TT table entries 156 having pointers which were associated with Page A have been released, and moved to the Free List 165 in view of the empty page operation. Then, as depicted in FIG. 10, the TT entries for Page A have been modified to reflect the original state of Page B and the TT entries for Page B have been set to the empty state.

Figure 11:
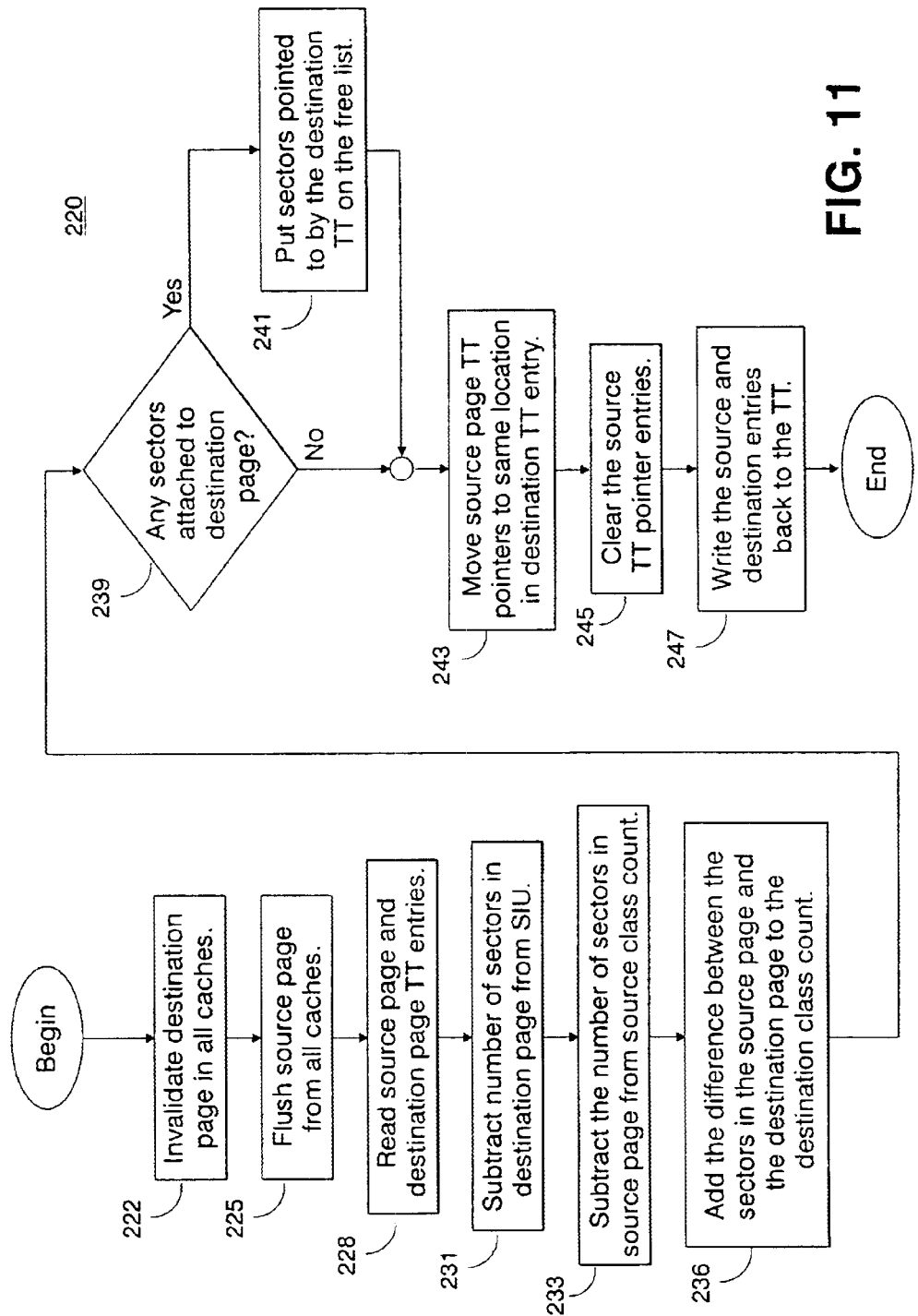
FIG. 11 is a flow diagram for the Page Move operation in the indirect accessed memory system.

FIG. 11 is a flow diagram for the Page Move operation 220 wherein the sectors from the destination page, e.g., Page A, are returned to the free list and the sectors of the source page, e.g., Page B, are moved to the destination page. It is understood in such page operation that the SIU, and class counters are updated appropriately. More particularly, as shown in FIG. 11, the destination page (e.g., page A) in all caches are first invalidated at step 222, and, the source page (e.g., page B) is flushed from all caches at step 225. Then, at step 228, all source page and destination page TT entries are read. At step 231, the number of sectors in the destination page is subtracted from the SIU and at step 233, the number of sectors in the source page is subtracted from the source class count. Next, at step 236 the difference between the number of sectors in the source page and the destination page is added to the destination class count. At step 239, a determination is made as to whether any sectors remain attached to the destination page. If sectors remain attached to the destination page, then the sectors pointed to by the destination TT are placed on the free list as indicated at step 241. Otherwise, and until no further sectors remain attached to the destination page, the process continues to step 243 where the source page TT pointers are moved to the same location in the destination TT entry. Then, at step 245, the source TT pointer entries are cleared and the source and destination entries are written back to the TT at step 247. As a page may comprise several blocks it should be understood that process steps 228–247 would repeat for each block in the page.

Two more page operations are now described that relate to "Swap Page" and "Copy Page".

Figure 12:
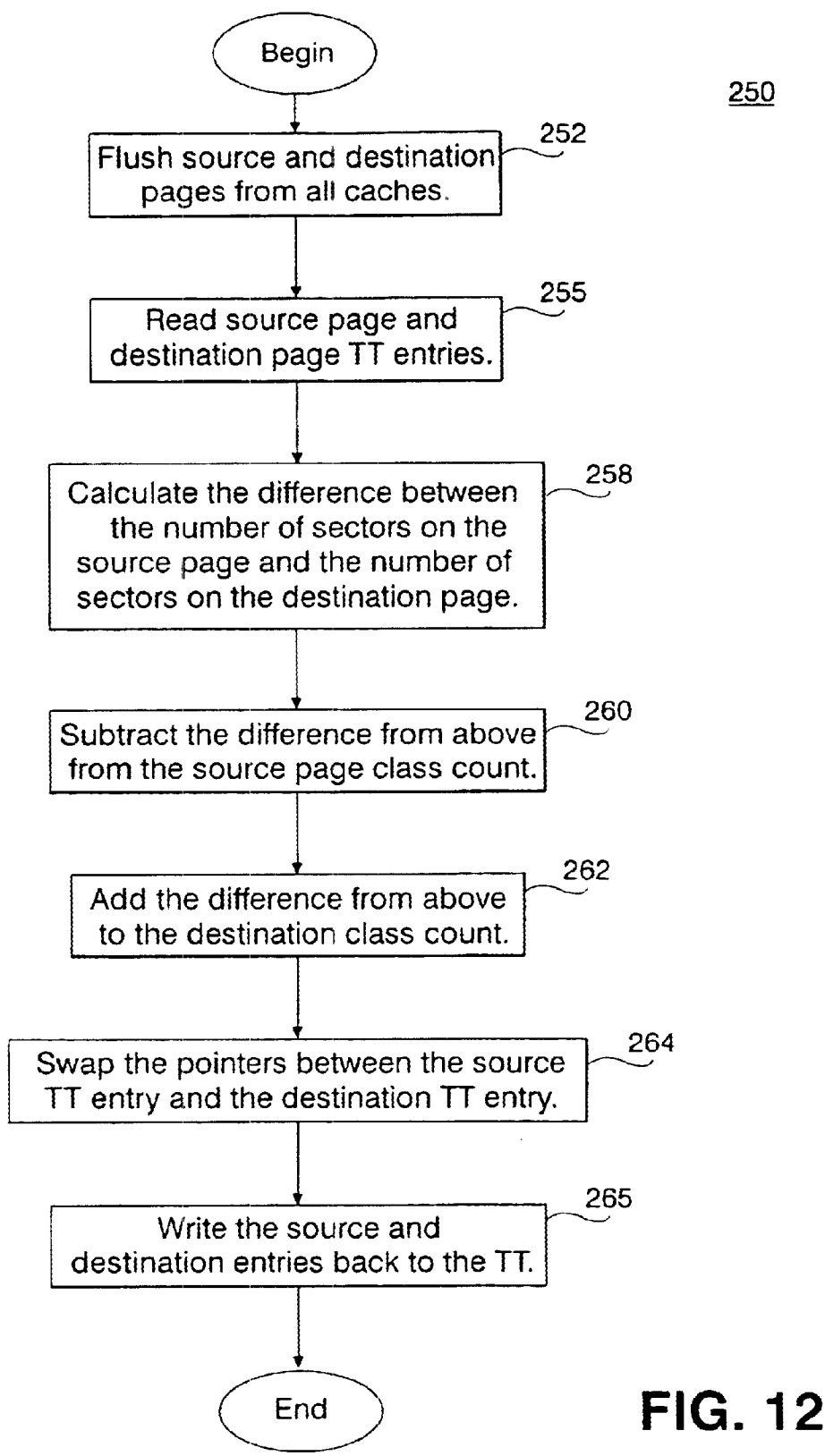
FIG. 12 is a flow diagram for the Swap Page operation in the indirect accessed memory system.

FIG. 12 is a flow diagram for the Swap Page operation 250 wherein the sectors associated with a source page, e.g., Page A, are swapped with sectors associated with a destination page, e.g., Page B. As shown in FIG. 12, the source and destination pages are first flushed in all caches at step 252, and, the source page and destination page TT entries are read at step 255. At step 258, the difference between the number of sectors on the source page and the number of sectors on the destination page is calculated. Then, at step 260, the calculated difference from previous step 258 is subtracted from the source page class count, and at step 262, the calculated difference from previous step 258 is added from the destination page class count. Then, at step 264, the pointers between the source TT entry and the destination TT entry are swapped, and at step 265, the corresponding source and destination entries are written back to the TT. As a page may comprise several blocks it should be understood that process steps 255–265 would repeat for each block in the page.

Figure 13:
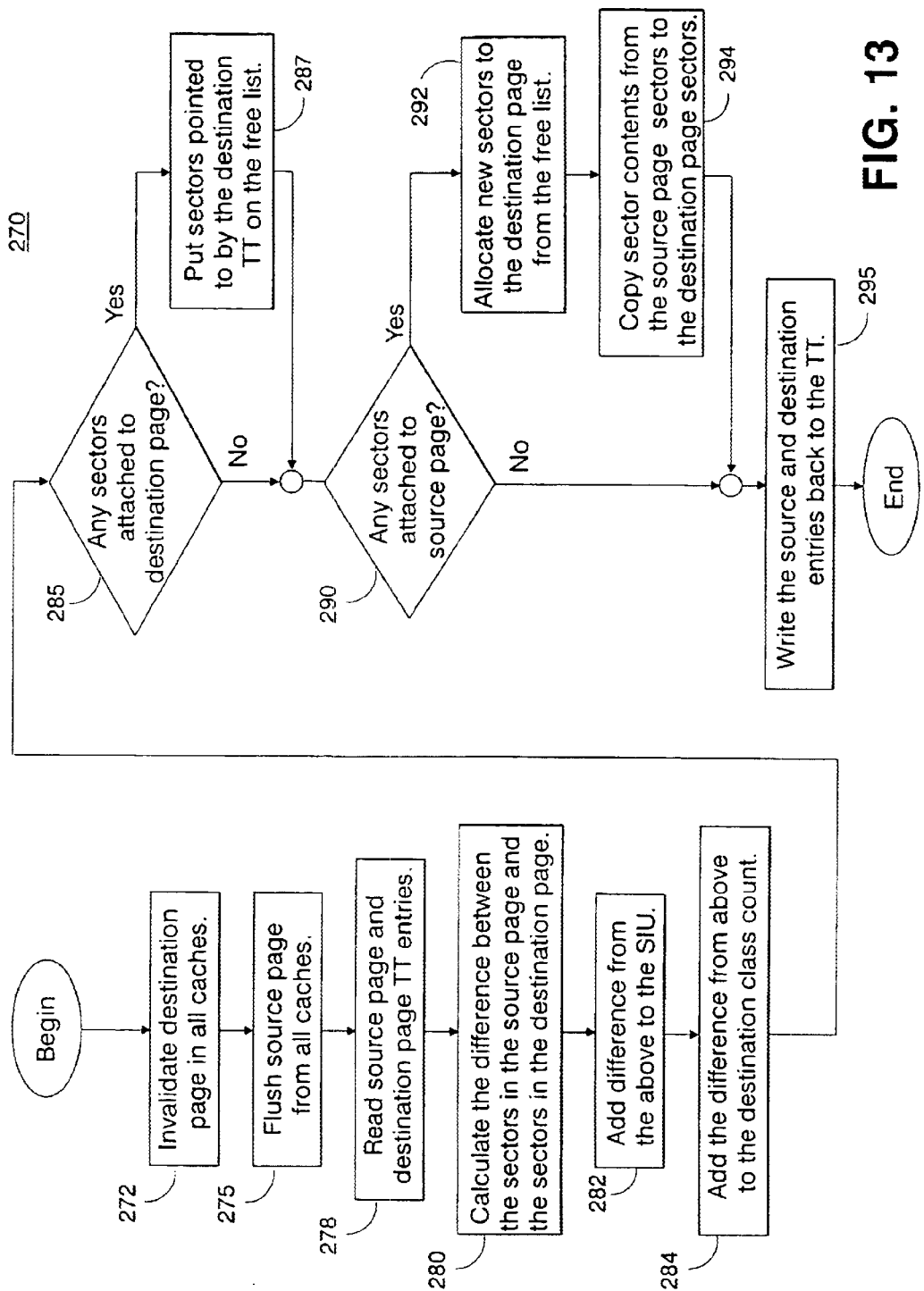
FIG. 13 is a flow diagram for the Copy Page operation in the indirect accessed memory system.

FIG. 13 is a flow diagram for the Copy Page operation 270 wherein the sectors from the source page, e.g., Page A, are copied to sectors associated with a destination page. More particularly, as shown in FIG. 13, the destination page in all caches are first invalidated at step 272, and, the source page is flushed from all caches at step 275. Then, at step 278, all source page and destination page TT entries are read and, at step 280, the difference between the number of sectors in the source page and the number of sectors in the destination page is calculated. Next, at step 282 the difference calculated in the previous step 280 is added to the SIU and, at step 284, the difference calculated in the previous step 280 is added to the destination class count. Next, at step 285, a determination is made as to whether any sectors remain attached to the destination page. If sectors remain attached to the destination page, then the sectors pointed to by the destination TT are placed on the free list as indicated at step 287. Otherwise, and until no further sectors remain attached to the destination page, the process continues to step 290 where a determination is made as to whether any sectors remain attached to the source page. If sectors remain attached to the source page, then at step 292, new sectors are allocated to the destination page from the free list, and, at step 294, the sector contents from the source page sectors are copied to the destination page sectors. Otherwise, and until no further sectors remain attached to the source page, the source and destination entries are written back to the TT at step 295. As a page may comprise several blocks it should be understood that process steps 278–295 would repeat for each block in the page.

From the foregoing flow diagrams of FIGS. 9, 11, 12 and 13 and the accompanying description, it is understood that the state of the translation table TT includes information important for the efficient usage and management of dynamically allocated memory in the indirect memory access system. In the indirect memory access system 100 of FIG. 1, the contents of the TT is not directly available to programs executing on the processor. A page operation is provided that makes this information readily available to such operating system and management software. For example, as shown in FIG. 1, the memory controller 175 is provided with a TT Buffer 177 which is a small memory array that is large enough to hold one or more TT entries. The current contents of the TT Buffer may be read by the processor using normal memory access instructions. In addition the TT Buffer 177 may be loaded with TT entries copied from the TT 155 under control of a special page operation command referred to herein as a "Read TT Entries" page operation. In this command, a first register 'AR1' 178, shown in FIG. 1, is loaded with the real address of the TT entries of interest and the command to read the TT is issued through a command (CMD) register 176. Once the TT entries are in, a TT Buffer program running in the processor 110 may analyze the entries for information like the number of sectors assigned to a page, or the number of pages which are empty, etc.

Figure 14:
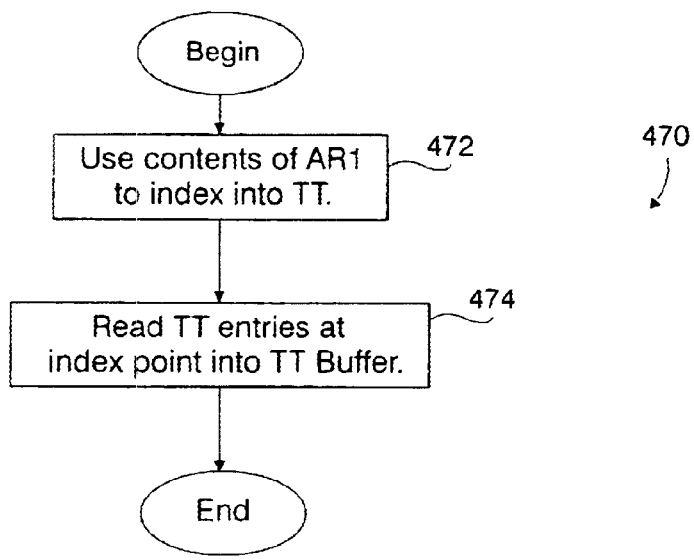
FIG. 14 illustrates a flow diagram depicting the Read TT Entries operation in the indirect accessed memory system.

FIG. 14 illustrates a flow diagram depicting the "Read TT Entries" operation 470. It is understood that this operation retrieves an instantaneous snapshot of the entries for the requested page and does not affect the state of the memory. As shown in FIG. 14, the Read TT Entries operation comprises a first step 472 where the contents of register AR1 are used to index into the TT, and, a second step 474, where the TT entries at the index point are read into the TT Buffer element 177 (FIG. 1).

Page operations are performed by directly interacting with the memory management function in the memory controller 175. Three additional control interfaces are provided to the memory controller 175 for this capability: a first Address register (AR1) 178 in the system block diagram 100 of FIG. 1 which is loaded with the page address of the memory block being manipulated or the source address for the data being moved or copied; a second Address register (AR2) 179 in the system block diagram of FIG. 1 which is used for the destination address for data being moved or copied; and, a command register CMD 176 shown in FIG. 1, which enables initiation of the page operation.

Figure 15:
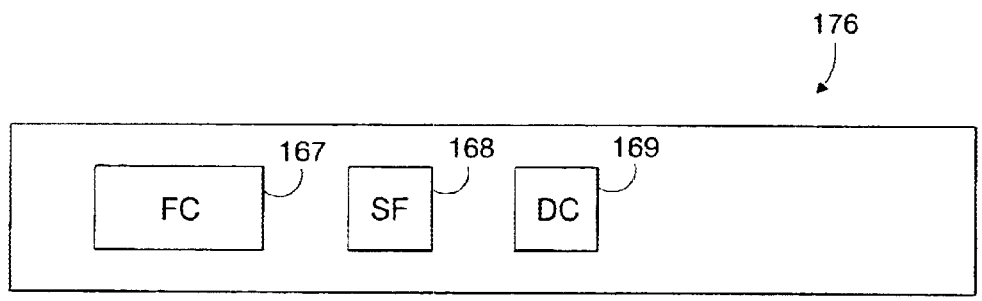
FIG. 15 depicts the fields of a CMD command register 176 implemented in the indirect accessed memory system.

FIG. 15 depicts the internal fields of the CMD command register 176 including a function code (FC) 167 and a start flag (SF) bit field 168. Initiation of a page operation is enabled after receiving a function code (FC) 167 and setting the start flag (SF) bit 168 in the command register 176. Completion of a page operation is indicated when the memory controller 175 resets the start bit 168 in the command CMD register 176 to indicate that the operation is done.

It should be further understood, however, that page operations do change the contents of real memory as observed by the processors in the system. For example, when a page operation is performed, any caches which maintain copies of any portions of the associated blocks must be updated appropriately. This is performed using the normal cache coherency protocols of the system with coherency actions initiated by the page operation control logic. Certain page operations, "Empty page," for example, modify or destroy the data stored in the associated block. When all of the data in a block is destroyed, the underlying physical memory assigned to the block may be released for usage by another block in the system. The page operation logic interacts with the memory management logic to cause the release of the associated physical memory when the data of that block is destroyed as a result of the page operation. Data modifying page operations must also update or invalidate any cached copies of these blocks. The actual completion of page operations may be deferred until the data in the affected blocks is actually needed. To allow this deferral, any block with a pending page operation is marked in the CTT with an indication that an operation is pending. If another memory operation is initiated to a block with an outstanding page operation, the new operation is deferred until the page operation is completed. Coherency operations associated with a page operation which is pending, must be completed before the page operation completion is indicated in the control register.

Coherency Management in Page Operations

Figure 16:
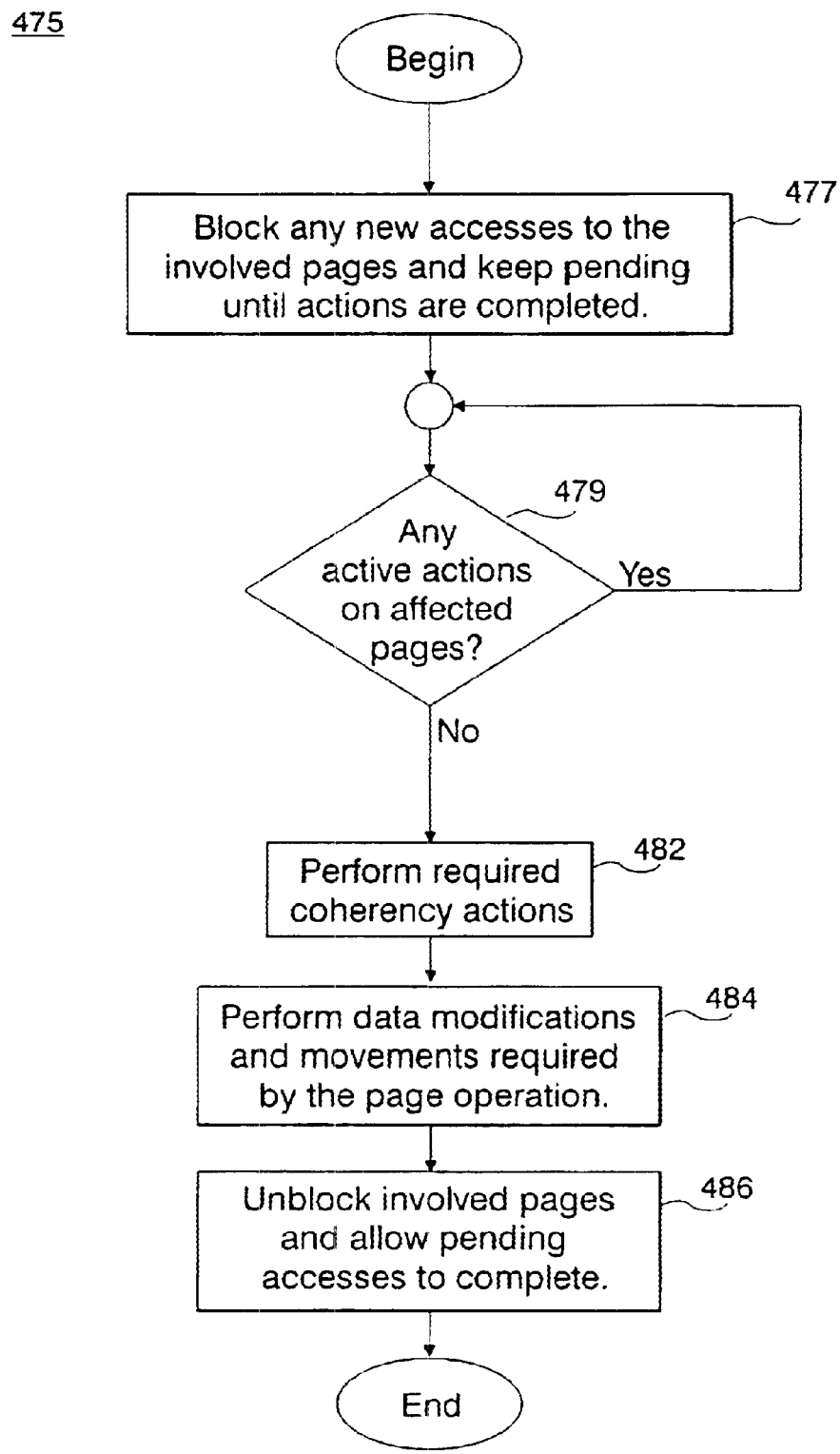
FIG. 16 is a flow chart depicting the flow required to maintain consistent memory and cache state during the performance of a page operation.

As mentioned, some page operations change the state of the memory system. As another example, the swap page operation changes the state of both the source and the destination pages. In the system depicted in FIG. 1 where portions of these pages may be cached in the processor, these caches 111, 112 must be updated in a coherent manner to assure that memory state is maintained consistent in all levels of storage. The flow diagrams depicted in FIGS. 9, 11, 12 and 13 describe operations which modify memory contents and require coherency actions on the source and destination pages to maintain full coherency. In addition to the cache flush and invalidate operations, accesses to the pages involved in the page operations are blocked until the page operation has been completed. FIG. 16 is a flow chart depicting the flow 475 required to maintain consistent memory and cache state during the performance of a page operation. New accesses to the affected pages are held pending until the page operation is completed. Any ongoing accesses to the affected pages are allowed to complete. The operation required coherency operations are performed, the actual page operation is performed, and, finally any pending accesses to the pages are allowed to proceed.

More particularly, as shown in FIG. 16, there is provided a first step 477 which requires blocking of any new accesses to the involved pages and keep the accesses pending until actions are completed. Then at step 479 a decision is made as to whether there has been any active action(s) on the effected pages. If yes, the process waits pending until actions are completed. Once they are completed, the process proceeds to step 482 where the required coherency actions are performed. Then, at step 484, data modifications and data movements required by the page operation are performed. Finally, at step 486, the pending accesses are allowed to complete and the involved pages are unblocked.

In certain cases the coherency of the pages involved in the page operation is known before the operation is started. In these instances, time and loading on the coherency management circuitry may be saved by only performing the coherency operations required. An example of when this is true is when page operations are used to move data between active pages and pages which are used only to store inactive data such as is done with paging stores in virtual memory systems. In this case, the coherency of the inactive pages is known and the relevant actions may be omitted. Table 1 describes the coherency options for each of the Empty, Move, Swap and Copy page operations which change memory state.

TABLE 1

Coherency options for Page Operations

| Page Operation | Source AR1 | Destination AR2 | |
|---|---|---|---|
| | | Full Coherency | Partial Coherency |
| Empty Page | Invalidate | N/A | N/A |
| Move Page | Flush | Invalidate | none |
| Swap Page | Flush | Flush | none |
| Copy Page | Flush | Invalidate | none |

As shown in Table 1, full coherency is always performed on the source page, but coherency operations on the destination page may be omitted. Referring back to FIG. 16, the CMD register 176 is provided with a Destination Coherent (DC) bit 169 that is set when coherency is desired on the destination page. Otherwise, only partial coherency is assured and the coherency actions on the destination page will be omitted.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A computing system for performing high speed data page operations having a processor device for generating real addresses associated with memory locations of a real memory system for reading and writing of data thereto, said system comprising:

a plurality of memory blocks in said real memory system for storing said data, a physical memory storage for storing the pages of data comprising one or more real memory blocks, each said real memory block partitioned into one or more sectors, each comprising contiguous bytes of said physical memory;

a translation table structure in said physical memory storage having entries for associating a real address with sectors of said physical memory, each translation table entry including one or more pointers for pointing to a corresponding sector in its associated real memory block, said table accessed for storing data in one or more allocated sectors for memory read and write operations initiated by said processor; and a control device for directly manipulating entries in said translation table structure for performing block swap and block move page operations for all blocks in a page without actually accessing physical memory data contents.

2. The computing system as claimed in claim 1, wherein a page operation includes moving blocks associated from a source page to a destination page, said control device directly moving sector pointers from entries of each block associated with a source page in said translation table to entries in said translation table of blocks associated with a destination page.

3. The computing system as claimed in claim 2, further comprising a first memory mapped register for specifying addresses associated with said source and destination pages involved in a page operation, said addresses specified by said first register accessible by a system processor device (CPU).

4. The computing system as claimed in claim 3, further comprising a second memory mapped register accessible by said CPU for commanding specific page operations and reporting of their status.

5. The computing system as claimed in claim 4, wherein said second memory mapped register accessible by said CPU includes a data field for receiving a function code by said CPU for commanding a particular page operation.

6. The computing system as claimed in claim 4, wherein said second memory mapped register accessible by said CPU includes a status bit field for indicating a status of said page operation, said status including one of: a busy status and a completion status.

7. The computing system as claimed in claim 3, wherein said control device further comprises mechanism for suspending memory accesses to source and destination pages while a page operation is performed.

8. The computing system as claimed in claim 5, wherein said control device further comprises mechanism for dynamically allocating sectors in a memory block and calculating an index into an allocated sector for performing data read and data write operations thereto, said control device implementing a free list structure having address pointers for pointing to unallocated sectors to be allocated.

9. The computing system as claimed in claim 8, wherein a function command code specified in said second register indicates a page operation requiring pointers for memory sectors of a page referenced by a source page to be returned to said free list structure.

10. The computing system as claimed in claim 8, wherein a function command code specified in said second register indicates a page operation requiring pointers for memory sectors of a source page to be returned to the free list structure.

11. The computing system as claimed in claim 8, wherein a function command code specified in said second register indicates a page operation that requires sectors of the physical memory of a destination page to be moved to sectors associated with physical memory of a source page.

12. The computing system as claimed in claim 8, wherein a function command code specified in said second register indicates a page operation that requires addition or deletion of physical memory sectors of a destination page such that its physical size is equivalent to a source destination page.

13. The computing system as claimed in claim 8, wherein a function command code specified in said second register indicates a copy page operation wherein pointers to sectors of physical memory referenced by a source page are copied to pointers for sectors of physical memory referenced by a destination page.

14. The computing system as claimed in claim 8, wherein a function command code specified in said second register indicates a swap page operation wherein pointers of sectors of physical memories referenced by source page and destination page are exchanged.

15. The computing system as claimed in claim 8, further comprising a caching hierarchy of one or more cache devices associated with said CPU for caching memory data contents, wherein a function command code specified in said second register indicates a page operation requiring the memory addresses associated with a source or destination page to be invalidated in the memory caching hierarchy, wherein cached portions of a source page and destination page are invalidated in said cache devices as part of a page operation.

16. The computing system as claimed in claim 15, wherein a function command code specified in said second register indicates a page operation requiring the memory addresses associated with a source or destination page to be flushed from the memory caching hierarchy, wherein cached portions of said source or destination pages are flushed from said cache devices as part of a page operation.

17. The computing system as claimed in claim 16, wherein said second memory mapped register accessible by said CPU includes a destination coherent bit field for indicating whether coherency or partial coherency is to be maintained during a page operation, said partial coherency enabling cache flush or invalidate actions to be omitted for a destination page.

18. The computing system as claimed in claim 5, further comprising a translation table buffer device accessible by said CPU for storing translation table entries and accessible by said CPU using normal memory access instructions, wherein a function command code specified in said second memory mapped register initiates copying of contents of a translation table entry for a source page to said buffer device.

19. A method for performing high speed data page operations in a computer system comprising a real system memory and including a processor device for generating real addresses associated with memory locations of said real memory system for reading and writing data thereto, said method comprising:

a) providing a physical memory storage for storing pages of data comprising one or more real memory blocks, each said real memory block comprising one or more sectors, each comprising contiguous bytes of said physical memory;

b) maintaining a translation table structure in said physical memory storage having entries for associating a real address with sectors of said physical memory, each translation table entry including one or more pointers for pointing to a corresponding sector in its associated real memory block, said table accessed for storing data in one or more allocated sectors for memory read and write operations initiated by said processor; and c) directly manipulating entries in said translation table structure for performing a block swap and block move page operation for all blocks in a page without actually accessing physical memory data contents.

20. The method as claimed in claim 19, wherein a page operation includes a moving blocks associated from a source page to a destination page, said manipulating step c) including directly moving sector pointers from entries of each block associated with a source page in said translation table to entries in said translation table of blocks associated with a destination page.

21. The method as claimed in claim 20, wherein said computer system includes a first memory mapped register accessible by a CPU for specifying addresses associated with said source and destination pages involved in a page operation, said method including the step of specifying addresses for said CPU access.

22. The method as claimed in claim 21, wherein said computer system includes a second memory mapped register accessible by said CPU for commanding specific page operations, said method further including the step of generating for receipt by said second memory mapped register a function code for commanding a particular page operation.

23. The method as claimed in claim 22, further including the step of indicating a status of a page operation in a status bit field provided in said second memory mapped register for access by said CPU, said status bit field indicating one of: a busy status and a completion status.

24. The method as claimed in claim 20, further including the step of suspending memory accesses to source and destination pages while a page operation is performed.

25. The method as claimed in claim 22, further including the steps of:

dynamically allocating sectors in a memory block and calculating an index into an allocated sector for performing data read and data write operations thereto; and, implementing a free list structure having address pointers for pointing to unallocated sectors to be allocated.

26. The method as claimed in claim 25, further including the step of: specifying a function command code in said second register for indicating a page operation requiring pointers for memory sectors of a page referenced by a source page to be returned to said free list structure.

27. The method as claimed in claim 25, further including the step of: specifying a function command code in said second register for indicating a page operation requiring pointers for memory sectors of a source page to be returned to the free list structure.

28. The method as claimed in claim 25, further including the step of: specifying a function command code in said second register for indicating a page operation that requires sectors of the physical memory of a destination page to be moved to sectors associated with physical memory of a source page.

29. The method as claimed in claim 25, further including the step of: specifying a function command code in said second register for indicating a page operation that requires addition or deletion of physical memory sectors of a destination page such that its physical size is equivalent to a source destination page.

30. The method as claimed in claim 25, further including the step of: specifying a function command code in said second register for indicating a copy page operation requiring pointers to sectors of physical memory referenced by a source page to be copied to pointers for sectors of physical memory referenced by a destination page.

31. The method as claimed in claim 25, further including the step of: specifying a function command code in said second register for indicating a swap page operation requiring an exchange of pointers to sectors of physical memories referenced by source page and destination page.

32. The method as claimed in claim 25, wherein said computer system further comprises a caching hierarchy of one or more cache devices associated with said CPU for caching memory data contents, said method including the step of: specifying a function command code in said second register for indicating a page operation requiring the memory addresses associated with a source or destination page to be invalidated in the memory caching hierarchy, wherein cached portions of a source page and destination page are invalidated in said cache devices as part of a page operation.

33. The method as claimed in claim 32, further including the step of: specifying a function command code in said second register for indicating a page operation requiring the memory addresses associated with a source or destination page to be flushed from the memory caching hierarchy, wherein cached portions of said source or destination pages are flushed from said cache devices as part of a page operation.

34. The method as claimed in claim 33, wherein said second memory mapped register accessible by said CPU includes a destination coherent bit field for indicating whether coherency or partial coherency is to be maintained during a page operation, said method further including the step of: indicating a page operation requiring said partial coherency, whereby cache flush or invalidate actions are omitted for a destination page.

35. The method as claimed in claim 33, further including the step of: specifying a function command code in said second register for initiating copying of contents of a translation table entry for a source page to a translation table buffer device accessible by said CPU for storing a translation table entry.

* * * * *